(12) United States Patent
Cho et al.

(10) Patent No.: US 8,615,218 B2
(45) Date of Patent: Dec. 24, 2013

(54) METHOD FOR REQUESTING, GENERATING AND DISTRIBUTING SERVICE-SPECIFIC TRAFFIC ENCRYPTION KEY IN WIRELESS PORTABLE INTERNET SYSTEM, APPARATUS FOR THE SAME, AND PROTOCOL CONFIGURATION METHOD FOR THE SAME

(75) Inventors: Seok-Heon Cho, Iksan (KR); Ae-Soon Park, Daejeon (KR); Chul-Sik Yoon, Seoul (KR); Kyung-Soo Kim, Daejeon (KR); Jee Hwan Ahn, Daejeon (KR)

(73) Assignees: Electronics and Telecommunications Research Institute (KR); Samsung Electronics Co., Ltd. (KR); KT Corporation (KR); SK Telecom Co., Ltd (KR); KTFreetel Co., Ltd (KR); Hanaro Telecom., Inc. (KR)

( * ) Notice: Subject to any disclaimer, the term of this patent is extended or adjusted under 35 U.S.C. 154(b) by 1014 days.

(21) Appl. No.: 10/582,440

(22) PCT Filed: Dec. 8, 2004

(86) PCT No.: PCT/KR2004/003212
§ 371 (c)(1),
(2), (4) Date: Apr. 23, 2007

(87) PCT Pub. No.: WO2005/057321
PCT Pub. Date: Jun. 23, 2005

(65) Prior Publication Data
US 2007/0281665 A1 Dec. 6, 2007

(30) Foreign Application Priority Data

Dec. 9, 2003 (KR) .................. 10-2003-0088895
Jun. 30, 2004 (KR) .................. 10-2004-0050346

(51) Int. Cl.
*H04M 3/16* (2006.01)
(52) U.S. Cl.
USPC ........... 455/411; 455/410; 455/450; 455/466; 455/404.2
(58) Field of Classification Search
USPC ............... 455/411, 466, 450, 410, 404.2
See application file for complete search history.

(56) References Cited

U.S. PATENT DOCUMENTS 5,602,916 A * 2/1997 Grube et al. ........... 380/270
6,578,075 B1 * 6/2003 Nieminen et al. ........ 709/221
(Continued)

OTHER PUBLICATIONS

IEEE Standard for Local and metropolitan area networks, Part 16: Air Interface for Fixed Broadband Wireless Access Ssytems, IEEE Std 802.16—2001.*

*Primary Examiner* — Jean Gelin
*Assistant Examiner* — Qun Shen
(74) *Attorney, Agent, or Firm* — The Farrell Law Firm, P.C.

(57) ABSTRACT

Disclosed are a method for requesting, generating and distributing a service-specific traffic encryption key in a wireless portable Internet system, an apparatus for the same, and a protocol configuration method for the same. In the present invention, a subscriber station sends a Key Request message for requesting a service-specific traffic encryption key to the base station using a PKM-REQ MAC message, and a base station analyzes the Key Request message to generate the requested service-specific traffic encryption key. Subsequently, the base station sends a Key Reply message, including the generated service-specific traffic encryption key, to the subscriber station using a PKM-RSP MAC message. If the base station fails to generate the key, the base station sends a Key Reject message, including a reason for the failure, to the subscriber station.

20 Claims, 10 Drawing Sheets

(56) References Cited

U.S. PATENT DOCUMENTS

| | | | |
|---|---|---|---|
| 6,763,112 B1* | 7/2004 | Haumont | 380/247 |
| 7,073,055 B1* | 7/2006 | Freed et al. | 713/155 |
| 7,239,705 B2* | 7/2007 | Kelley et al. | 380/239 |
| 7,310,307 B1* | 12/2007 | Das et al. | 370/229 |
| 7,617,317 B2* | 11/2009 | Jones et al. | 709/227 |
| 2001/0032232 A1* | 10/2001 | Zombek et al. | 709/201 |
| 2002/0188562 A1* | 12/2002 | Igarashi et al. | 705/40 |
| 2003/0078061 A1* | 4/2003 | Kim | 455/466 |
| 2003/0140257 A1* | 7/2003 | Peterka et al. | 713/201 |
| 2004/0017918 A1* | 1/2004 | Nicolas | 380/279 |
| 2004/0250069 A1* | 12/2004 | Kosamo | 713/168 |
| 2005/0015583 A1* | 1/2005 | Sarkkinen et al. | 713/150 |
| 2005/0289347 A1* | 12/2005 | Ovadia | 713/171 |

\* cited by examiner

| Attribute | Contents |
|---|---|
| Service Type | Service Type (Unicast or multicast or broadcast) |
| Multicast Service Group ID | Identifier of multicast service group |

Fig. 7

| Type | Length | Value |
|---|---|---|
| 28 | 1 | 0: Unicast Service<br>1: Multicast Service<br>2: Broadcast Service<br>3-255: Reserved |

Fig. 8

| Type | Length | Value |
|---|---|---|
| 29 | 1 | Identifier of the multicast service group |

Fig. 9

| Error Code | Messages | Contents |
|---|---|---|
| 7 | Key Reject | Unsupported Service Type |
| 8 | Key Reject | Unauthorized Multicast Service Group ID |

Fig. 10

METHOD FOR REQUESTING, GENERATING AND DISTRIBUTING SERVICE-SPECIFIC TRAFFIC ENCRYPTION KEY IN WIRELESS PORTABLE INTERNET SYSTEM, APPARATUS FOR THE SAME, AND PROTOCOL CONFIGURATION METHOD FOR THE SAME

TECHNICAL FIELD

The present invention relates to security in a wireless portable Internet system, and more particularly relates to an apparatus for generating and distributing a service-specific traffic encryption key in the IEEE 802.16 wireless Metropolitan Area Network (MAN) system, a method for the same, and a protocol configuration method for the same.

BACKGROUND ART

As the next-generation communication technology, wireless portable Internet access further provides mobility to a local data communication system such as a conventional wireless Local Area Network (LAN) using a stationary access point (AP).

There are various standard protocols that have been developed for supporting the wireless portable Internet access, and the IEEE 802.16 working group tries to establish an international standard of the wireless portable Internet protocol.

The authentication and authorization standard defined by the IEEE 802.16 establishes authentication functions for stations in the wide area network configured with wireless networks. In particular, since the subscriber station (SS) authentication function standardized by a privacy layer of the IEEE 802.16 is defined only for SSs within a fixed network, it is inappropriate for the authentication function to apply SSs or subscribers to be capable of supporting mobility, which is a current trend of mobile services. That is, since the authentication function does not specify detailed functions in a base station (BS) which describes messages and procedures for authenticating the subscriber stations on the basis of the fixed networks, additional functions of the base station are required for the mobile services. The requirement of additional functions requires the base station to have profiles of all subscribers who currently receive services, and the same requires a function of API for the CA interface or a function of accepting authentication clients for interface with an authentication server when the base station does not have the profiles.

Also, since the conventional authentication for the subscriber stations on the fixed network is based on digital certificates, the conventional authentication process is restricted to servers which perform certificate-based authentication when a user accesses an authentication server to be authenticated, and the conventional authentication process needs other improved functions for security of the base station since the conventional standard defines that the base station distributes a security key between the subscriber station and the base station.

Figure 1:
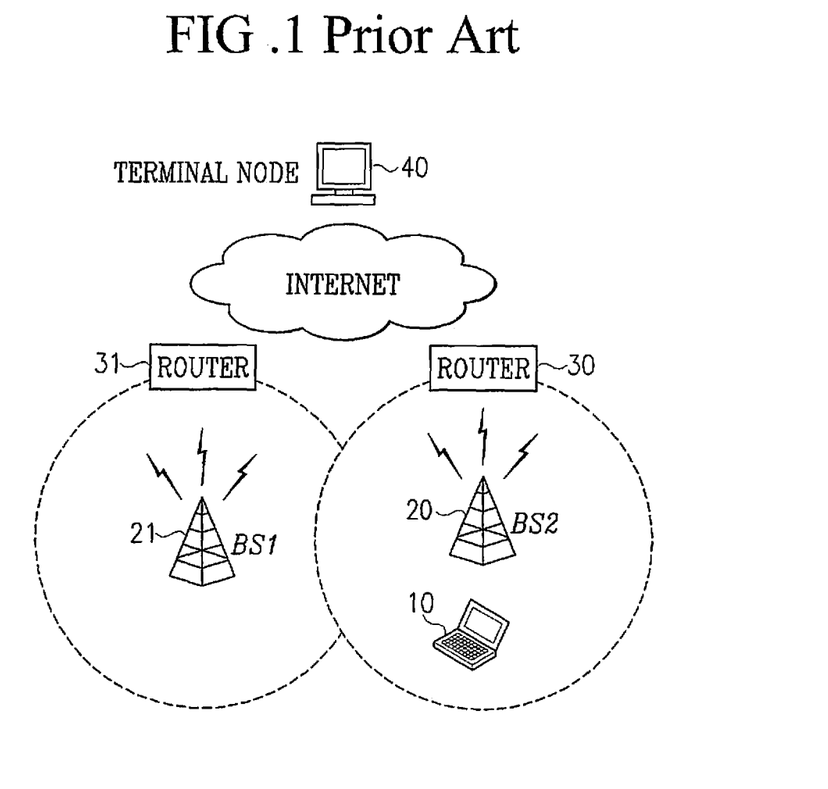
FIG. 1 shows a brief diagram of a wireless portable Internet according to an exemplary embodiment of the present invention.

FIG. 1 is a schematic diagram showing the outline of a wireless portable Internet system.

As shown therein, the wireless portable Internet system basically includes a subscriber station 10, base stations 20 and 21 performing wireless communication with the subscriber station 10, and routers 30 and 31 connected to the base stations 20 and 21.

The wireless LAN method such as the conventional IEEE 802.11 provides a data communication method which allows short-range radio communication with reference to fixed access points, which provides no mobility of the subscriber station (hereinafter, referred to as "SS") but which supports wireless short-range data communication other than wired short-range data communication.

Figure 10:
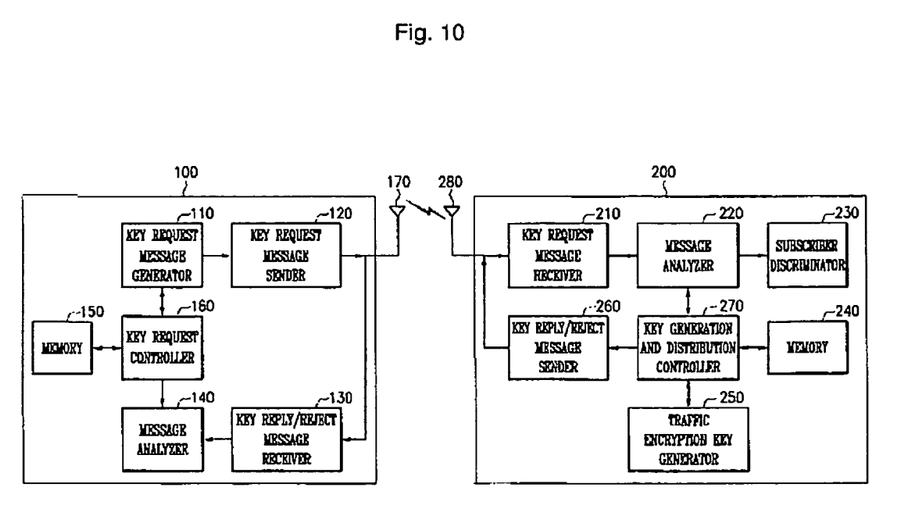
FIG. 10 is a block diagram of an apparatus for generating and distributing a service-specific traffic encryption key according to an embodiment of the present invention.

Meanwhile, a new wireless portable Internet system currently progressed by the IEEE 802.16 working group is designed to provide the mobility to the SS so as to provide a seamless data communication service when the SS 10 moves from one cell covered by a base station 20 manages to another cell covered by an associated base station 21 (refer to FIG. 10).

The IEEE 802.16 is a standard protocol supporting metropolitan area network (MAN) covering data communication within a metropolitan-sized area between the local area network (LAN) and the wide area network (WAN).

Hence, the wireless portable Internet system supports a handover of the SS 10 and allocates a dynamic IP address corresponding to the movement of the SS in a like manner of mobile communication service.

In the wireless portable Internet system, the SS 10 communicates with the base stations 20 and 21 by employing the OFDMA (Orthogonal Frequency Division Multiple Access) method. The OFDMA is a multiplexing method that combines the time division multiplexing (TDM) method and the frequency division method (FDM) using a plurality of orthogonal frequency subcarriers as a plurality of sub-channels. The OFDMA resists multi-paths fading, and sends data at a high rate.

Figure 2:
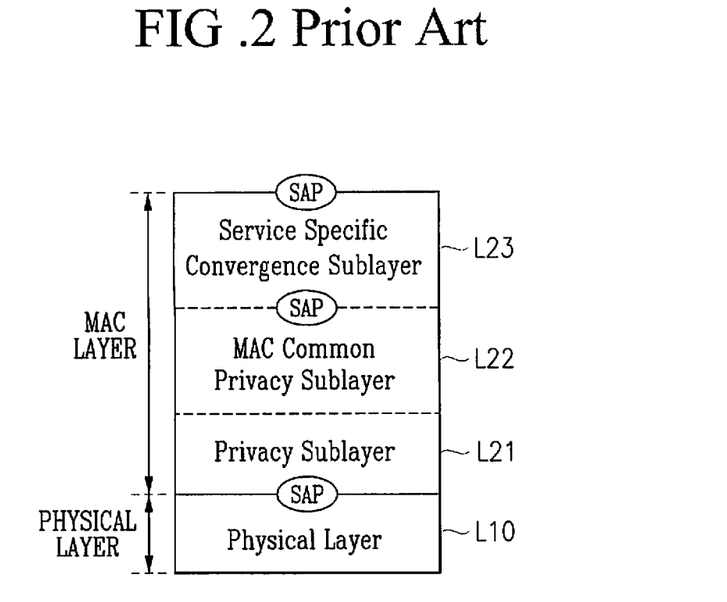
FIG. 2 shows a diagram for a layered protocol structure of the wireless portable Internet system shown in FIG. 1.

FIG. 2 shows a diagram for a layered protocol structure of the wireless portable Internet system shown in FIG. 1.

As shown in FIG. 2, the layered protocol structure of the IEEE 802.16 wireless portable Internet system includes a physical layer L10, and Media Access Control (MAC) layers L21, L22, and L23.

The physical layer L10 performs a wireless communication function including modulation/demodulation, and coding, etc., that have been typically provided by a physical layer.

Further, the wireless portable Internet system performs various functions using a single MAC layer compared to a wired Internet system performing functions that uses function-specific multiple sublayers.

The MAC layer has function-specific multiple sublayers: a privacy sublayer L21, a MAC common part sublayer L22, and a service-specific convergence sublayer L23.

The privacy sublayer L21 provides both authentication and encryption functions, and allows overlapping keys so that keys can be updated without interrupting the flow of data.

However, the privacy sublayer L21 provides authentication for secure network access and connection establishment to avoid theft of services, and also provides key exchange and encryption for data privacy. However, it authenticates a system only, and user authentication is provided by an upper layer (not shown) of the MAC layer.

The MAC common part sublayer L22 carries the key functions. It provides system access, bandwidth allocation, connection establishment, and connection maintenance. The MAC common part sublayer L22 also manages quality of service (QoS).

The service specific convergence sublayer L23 provides payload header suppression and QoS mapping for a constant flow of data.

Figure 3:
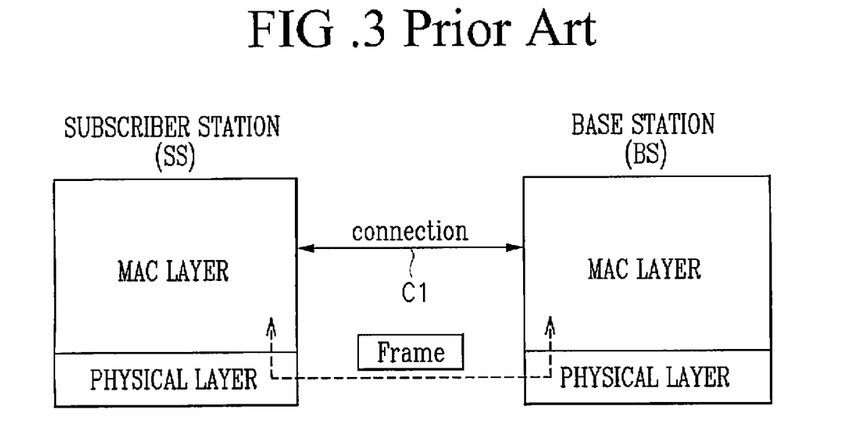
FIG. 3 shows a block diagram for a coupled structure between base stations and a subscriber station in the wireless portable Internet system shown in FIG. 1.

FIG. 3 shows a block diagram for a traffic structure between the base station 20 (hereinafter, referred to as "BS") and the subscriber station 10 in the wireless portable Internet system shown in FIG. 1.

As shown in FIG. 3, the MAC layer of the subscriber station 10 is connected to the MAC layer of the base station 20 through a traffic connection C1.

Herein, the "traffic connection C1" is a logical connection rather than a physical connection, and represents a mapping relationship between equivalent peers in the MAC of the SS and the BS for traffic transmission through each service flow.

Accordingly, parameters or messages defined in the traffic connection C1 state define functions between the MAC peer layers, and actually, the parameters or the messages are processed into frames and transmitted through the physical layer, and the frames are analyzed so that the functions corresponding to the parameters or the messages are performed in the MAC layer.

These messages further include various messages to perform request REQ, response RSP and acknowledgement ACK functions.

Meanwhile, to provide the subscribers with a security-proof network and fair service, the IEEE 802.16 wireless portable Internet system provides an encryption of traffic data which is regarded as a critical requirement for security and safety of networks, recently.

The conventional IEEE 802.16 wireless portable Internet system defines a method of generating and distributing a traffic encryption key to be used for security on a traffic connection so as to encrypt traffic data prior to establishing the traffic connection. According to this method, the SS and the BS use PKM-REQ (Privacy Key Management-Request) message and PKM-RSP (Privacy key Management-Response) message so as to generate and distribute a traffic encryption key. Herein, the PKM-REQ message and the PKM-RSP message are related to authentication. In other words, the SS sends a Key Request message, which is an internal message of the PKM-REQ messages, to the BS to request a traffic encryption key from the BS, and the BS sends a responding message to the SS. In detail, the BS sends a Key Reply message to the SS when the refreshment of the traffic encryption key is successful or a Key Reject message to the SS when the refreshment of the traffic encryption key is failed. The traffic encryption key is newly generated and distributed throughout the foregoing method, and the SS and the BS encrypt traffic data for transmission using the traffic encryption key.

However, such a conventional method for generating and distributing a traffic encryption key defined by the IEEE 802.16 wireless portable Internet system is limited to the unicast service between the SS and the BS.

However, the multicast service and the broadcast service also must be taken into consideration in the IEEE 802.16 wireless portable Internet system so as to provide extendable and secure services to a large number of subscribers.

Further, in the case of providing a multicast service or a broadcast service in the IEEE 802.16 wireless portable Internet system, special regard must be paid to some matters related to traffic data encryption. In other words, the service must be provided with proper restrictions for unauthorized users for the multicast service or the subscribers of other service providers for the broadcast service. However, the current standard does not clearly define such a restriction.

DISCLOSURE OF INVENTION

Technical Problem

It is an advantage of the present invention to provide an apparatus for generating and distributing a key for encryption of traffic by various services in a wireless portable Internet system, a method for the same, and a protocol configuration method for the same.

It is another advantage of the present invention to provide an apparatus for generating and distributing a service-specific traffic encryption key in a wireless portable Internet system that accepts a failure occurring in the service-specific traffic encryption key generation step, a method for the same, and a protocol configuration method for the same.

Technical Solution

In one aspect of the present invention, there is provided a method for requesting a service-specific traffic encryption key in a wireless portable Internet system, which method is for a subscriber station requesting a service-specific traffic encryption key from a base station wirelessly connected to the subscriber station in the wireless portable Internet system. The method includes: (a) determining a service type for the requested traffic encryption key to be used for security on a traffic connection to the base station before establishing the traffic connection; (b) generating a Key Request message for requesting a traffic encryption key Herding to the determined service type; and (c) sending the generated Key Request message to the base station using a Media Access Control (MAC) message.

Another aspect of the present invention provides a method for generating and distributing a service-specific traffic encryption key in a wireless portable Internet system, the method being for a base station generating and distributing a traffic encryption key by each service to a subscriber station wirelessly connected to the base station in the wireless portable Internet system. The method includes: (a) receiving a Key Request message used for requesting the service-specific traffic encryption key from the subscriber station; (b) analyzing the Key Request message to determine a service type; (c) generating a traffic encryption key Herding to the determined service type; and (d) generating a Key Reply message including the generated traffic encryption key and sending the generated Key Reply message to the subscriber station using a MAC message.

In a further aspect of the present invention, there is provided a protocol configuration method for generating and distributing a service-specific traffic encryption key in a wireless portable Internet system, which method is for generating and distributing a traffic encryption key used for security on a traffic connection between a base station and a subscriber station by each service in the wireless portable Internet system. The protocol configuration method includes: (a) the subscriber station sending a Key Request message for requesting a traffic encryption key by each service to the base station using a MAC message; and (b) the base station analyzing the Key Request message received from the subscriber station, generating the requested service-specific traffic encryption key, and sending a Key Reply message including the generated service-specific traffic encryption key to the subscriber station using a MAC message.

In still another aspect of the present invention, there is provided an apparatus for requesting a service-specific traffic encryption key in a wireless portable Internet system, which apparatus is wirelessly connected to a base station in the wireless portable Internet system to request a service-specific traffic encryption key from the base station. The apparatus includes: a Key Request message generator for generating a Key Request message for requesting the service-specific traffic encryption key from the base station; a Key Request message sender for sending the Key Request message of the Key Request message generator to the base station using a MAC message; a key reply/reject message receiver for receiving a Key Reply message or a Key Reject message from the base station using a MAC message; a message analyzer for analyzing the Key Reply message or the Key Reject message from the key reply/reject message receiver to extract the traffic encryption key from the Key Reply message, or analyze an error type from the Key Reject message; and a key request controller for controlling operations of the Key Request message generator, the Key Request message sender, the key reply/reject message receiver, and the message analyzer, requesting the base station to refresh the service-specific traffic encryption key and process the new traffic encryption key when it receives Key Request message or an error code when it receives Key Reject message.

In still another aspect of the present invention, there is provided an apparatus for generating and distributing a service-specific traffic encryption key in a wireless portable Internet system, which apparatus is for a base station generating and distributing a service-specific traffic encryption key to a subscriber station in the wireless portable Internet system. The apparatus includes: a Key Request message receiver for receiving a Key Request message from the subscriber station using a MAC message; a message analyzer for analyzing the Key Request message from the Key Request message receiver to extract information including a service type included in the Key Request message; a subscriber discriminator for determining whether or not a traffic encryption key can be generated to a requested service included in the Key Request message; a traffic encryption key generator for generating a service-specific traffic encryption key analyzed by the message analyzer; a Key Reply message sender for generating a Key Reply message including the traffic encryption key generated by the traffic encryption key generator according to the requested service type of the subscriber station, and sending the generated Key Reply message to the subscriber station using a MAC message; and a key generation and distribution controller for controlling operations of the Key Request message receiver, the message analyzer, the subscriber discriminator, the traffic encryption key generator, and the Key Reply message sender to generate and distribute a corresponding service-specific traffic encryption key by a request for service-specific traffic encryption key refreshment from the subscriber station.

BRIEF DESCRIPTION OF THE DRAWINGS

The accompanying drawings, which are incorporated in and constitute a part of the specification, illustrate an embodiment of the invention, and, together with the description, serve to explain the principles of the invention.

BEST MODE FOR CARRYING OUT THE INVENTION

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which same descriptions are provided have the same reference numerals.

Hereinafter, an apparatus for generating and distributing a service-specific traffic encryption key in a wireless portable Internet system according to an embodiment of the present invention will be described in detail with reference to the accompanying drawings.

Through the specification of the present invention, the term "portable wireless system" refers to "portable wireless MAN system."

Figure 4:
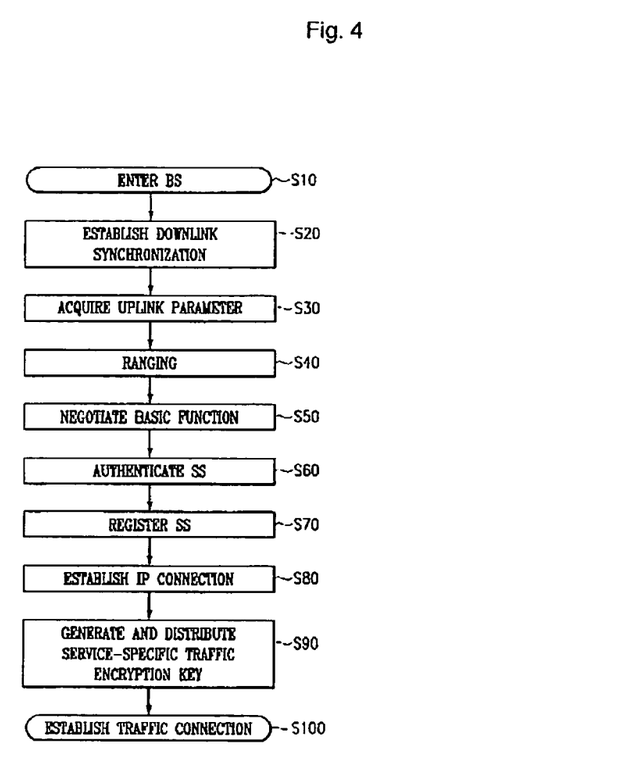
FIG. 4 shows a flowchart for establishing a traffic connection in the wireless portable Internet system according to an exemplary embodiment of the present invention.

FIG. 4 is a flow chart illustrating establishment of a traffic connection in a wireless Internet system according to an embodiment of the present invention.

Referring to FIG. 4, when a SS accesses a BS, in step S10, the BS establishes downlink synchronization with the SS, in step S20.

When the subscriber station 10 is synchronized to the downlink from the base station 20, the subscriber station 10 acquires an uplink parameter in step S30. For example, the parameter includes a channel descriptor message which follows a characteristic of the physical layer (e.g., the signal to noise ratio (SNR)).

The SS and the BS perform an initial ranging procedure, in step S40. During the initial ranging procedure, the BS commands a timing adjustment and a power adjustment to the SS. Once the initial ranging procedure is completed, a periodic ranging procedure is performed periodically.

Consequence to the completion of the ranging step S40, the SS and the BS negotiate the basic functions of the SS for connection establishment, in step S50. Once the negotiation is completed, the BS authenticates the SS using a certificate of the SS, in step S60.

Upon successful authorization for SS itself, the BS registers the equipment address with the network, in Step of S70. Then the SS attains an IP address via a Dynamic Host Transfer Protocol (DHCP) or MIP server to establish an IP connection, in step S80.

To provide a traffic service to the SS receiving the IP address, the BS performs a process of generating and distributing service-specific traffic encryption keys, in step S90, and establishes a traffic connection for the respective services, in step S100.

Figure 5:
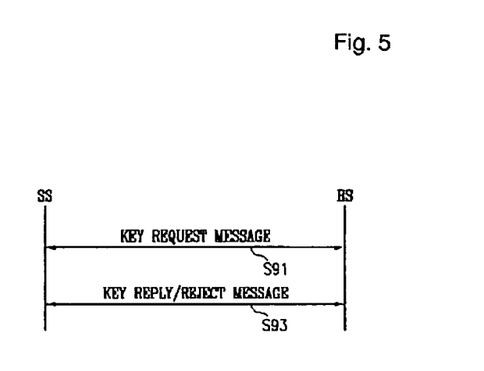
FIG. 5 is a detailed flow chart of the process for generating and distributing a service-specific traffic encryption key as shown in FIG. 4.

FIG. 5 is a detailed flow chart of a process for generating and distributing service-specific traffic encryption keys as shown in FIG. 4.

Referring to FIG. 5, the SS can use the traffic service after the completion of the process of IP connection establishment between the SS and the BS (the steps S10 to S80). The SS generates and distributes service-specific traffic encryption keys to encrypt the received traffic data, in step S90.

first, the SS sends a Key Request message of the PKM-REQ message to the BS so as to receive a traffic encryption key for a specific service, in step S91. The Key Request message includes a parameter for receiving the service specific-traffic encryption keys. Herein, the parameter will be described later.

In respond to the Key Request message from the SS, the BS encrypt a key to be allocated to the SS using a traffic encryption key generation mechanism based on all the field values of the received message and sends the result to the SS, in step S93.

In detail, when a traffic encryption key to be allocated to the SS is successfully generated, the BS sends a Key Reply message of the PKM-RSP message to the SS. However, when the BS fails to generate a traffic encryption key to be allocated to the SS, the BS sends a Key Reject message to the SS. The Key Reject message includes an error code related to the failure of key generation, and the error code will be described later.

In this manner, the BS sends the Key Reply message or the Key Reject message to the SS to complete the process of generating and distributing a traffic encryption key for the SS (the step S90).

The Key Reply message sent from the BS to the SS includes the traffic encryption key for the type of service that the SS desired. Upon receiving the Key Reply message, the SS encodes or decodes traffic data corresponding to the type of service by using the traffic encryption key received from the BS.

Figure 6:
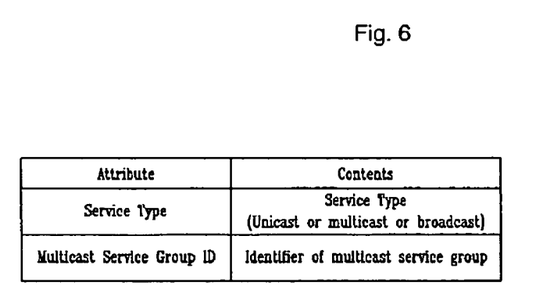
FIG. 6 shows a table of newly added parameters included in a Key Request message in a process for generating and distributing a service-specific traffic encryption key as shown in FIG. 5.

FIG. 6 shows a table of additionally required parameters included in the Key Request message so as to generate and distribute the service-specific traffic encryption key in FIG. 5.

Referring to FIG. 6, the parameters in the Key Request message sent by the SS to request refreshment of a traffic encryption key from the BS include a service type field and a multicast service group IP field.

The service type field indicates a type of the SS-desired service. The BS refers to the type of service, and generates a corresponding traffic encryption key. The multicast service group ID field acts as an identifier of a multicast service group, and is available only when the type of the SS-desired service for refreshing the traffic encryption key is for a multicast service. The multicast service group ID field is also used for the purpose of restraining the SS from using services provided from other multicast service groups in the case that the SS is not authorized.

Figure 7:
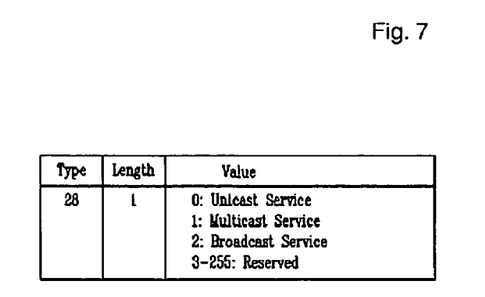
FIG. 7 shows the attributes of the service type parameter shown in FIG. 6.

FIG. 7 shows attributes of the service type parameter shown in FIG. 6.

Referring to FIG. 7, the service type parameter indicates a type of service corresponding to the traffic encryption. For example, the service type parameter has a type of '28,' a length of 1 byte, and a value indicating the type of services. For example, the type of service for the requested traffic encryption key is a unicast service when the service type parameter value is "0"; a multicast service when the service type parameter value is "1"; and a broadcast service when the service type parameter value is "2." Hence, the BS generates a service-specific traffic encryption key with reference to the value of the service type parameter included in the Key Request message from the SS, and distributes the generated key to the SS.

Figure 8:
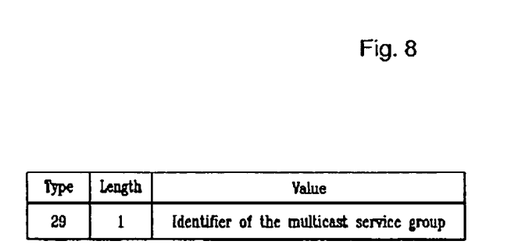
FIG. 8 shows the attributes of the multicast service group ID field shown in FIG. 6.

FIG. 8 shows the attributes of the multicast service group ID field shown in FIG. 6.

Referring to FIG. 8, the multicast service group ID is an identifier of the multicast service group provided by the IEEE 802.16 wireless portable Internet system. For example, the multicast service group ID parameter has a type of "29," a length of 1 byte, and a value as an identifier of the multicast service group.

The BS determines whether to generate a multicast service-specific traffic encryption key for the SS referring to the value of the multicast service group ID parameter included in the Key Request message sent from the SS. In other words, the BS determines whether SS can be authorized for the specific multicast service or not.

Figure 9:
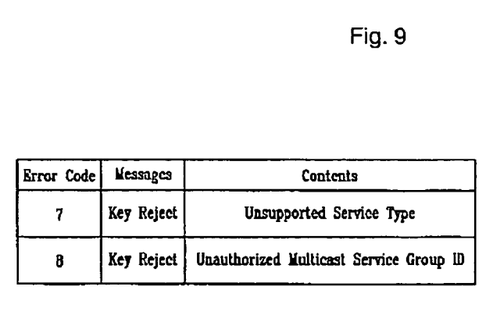
FIG. 9 shows a table of newly added error codes included in a Key Reject message in the process for generating and distributing a service-specific traffic encryption key as shown in FIG. 5.

FIG. 9 shows a table of error codes included in a Key Reject message to generate and distribute a service-specific traffic encryption key as shown in FIG. 5.

Referring to FIG. 9, when the BS fails to generate a service-specific traffic encryption key to be allocated to the SS, the BS sends a Key Reject message including an error code to the SS. The contents of the error code include the following parameters: "unsupported service type" and "unauthorized multicast service group ID."

The "unsupported service type" is one of the error code parameters included in the Key Reject message so as to represent that the type of service identified by the service type field included in the Key Request message from the SS is invalid so that it cannot be supported by the BS. For example, when the error code has a value of "7" in the Key Reject message from the SS, it indicates that the key generation is a failure by "unsupported service type."

Meanwhile, the "unauthorized multicast service group ID" field is an error code generated in the case that the service type parameter included in the Key Request message indicates a multicast service type and the identifier in the multicast service group ID parameter is invalid to allocate the traffic encryption key from the BS. For example, the error code field having a value of "8" in the Key Reject message from the SS indicates a failure by "unauthorized multicast service group ID."

Hereinafter, a description will be given as to an apparatus for generating and distributing a service-specific traffic encryption key in a wireless portable Internet system according to an exemplary embodiment of the present invention.

FIG. 10 is a block diagram of an apparatus for generating and distributing a service-specific traffic encryption key according to an exemplary embodiment of the present invention.

The apparatus for generating and distributing a service-specific traffic encryption key according to an embodiment of the present invention comprises a SS 100 and a BS 200, as shown in FIG. 10.

The SS 100 includes a Key Request message generator 110, a Key Request message sender 120, a Key Request/Reject message receiver 130, a message analyzer 140, a memory 150, and a key request controller 160.

The Key Request message generator 110 generates a Key Request message for requesting the BS 200 to allocate a service-specific traffic encryption key. The Key Request message is one of the RKM-REQ MAC messages in the IEEE 802.16. The Key Request message includes a service type parameter and a multicast service group ID parameter, as shown in FIG. 6.

The Key Request message sender 120 sends the Key Request message generated from Key Request message generator 110 to the BS 200.

The Key Reply/Reject message receiver 130 receives a Key Reply message or a Key Reject message from the BS 200 via an antenna 170 using a PKM-RSP message of the MAC message.

The message analyzer 140 analyzes the Key Reply message or the Key Reject message of the Key Reply/Reject message receiver 130 to extract a traffic encryption key from the Key Reply message or determine an error type from the Key Reject message.

The memory 150 stores the analyzing result of the message analyzer 140. For example, the analyzing result includes a traffic encryption key extracted from the Key Reply message and used for encryption during a next traffic data transmission, or an error code occurring due to a failure of generating the traffic encryption key.

The key request controller 160 controls the operations of the Key Request message generator 110, the Key Request message sender 120, the Key Reply/Reject message receiver 130, the message analyzer 140, and the memory 150 so as to request a service-specific traffic encryption key allocation from the BS 200 or process an error code upon occurrence of an error.

On the other hand, the BS 200 includes a Key Request message receiver 210, a message analyzer 220, a subscriber discriminator 230, a memory 240, a traffic encryption key generator 250, a Key Reply/Reject message sender 260, and a key generation and distribution controller 270.

The Key Request message receiver 210 receives a Key Request message of PKM-REQ MAC messages from the SS 100 through an antenna 280.

The message analyzer 220 analyzes the Key Request message received from Key Request message receiver 210 and determines whether parameters included in the Key Request message indicates, the service type or the multicast service group ID.

When the requested service according to the Key Request message is a multicast service, the subscriber discriminator 230 determines whether an identifier recorded on a multicast service group ID included in the Key Request message is valid to allocate a traffic encryption key. In other words, the subscriber discriminator 230 determines whether the SS is authorized for the multicast service group ID. In the case that the identifier of the multicast service group ID is invalid to allocate the traffic encryption key, the subscriber discriminator 230 displays a Key Reject message indicating "unauthorized multicast service group ID."

The memory 240 stores an analyzing result of the message analyzer 220 and a discrimination result of the subscriber discriminator 230.

The traffic encryption key generator 250 generates a service-specific traffic encryption key only when a request for a traffic encryption key by the SS is accepted.

When the traffic encryption key is successfully generated by the traffic encryption key generator 250, the Key Reply/Reject message sender 260 generates a Key Reply message including the generated traffic encryption key and sends the generated Key Reply message to the SS 100 through the antenna 280 using a PKM-RSP message of the MAC messages. When the traffic encryption key generator 250 fails to generate the traffic encryption key, the Key Reply/Reject message generator 260 generates a Key Reject message including an error code corresponding to the failure and sends the generated Key Reject message to the SS 100 using the PKM-RSP MAC message.

The key generation and distribution controller 270 controls the operations of the Key Request message receiver 210, the message analyzer 220, the subscriber discriminator 230, the memory 240, the traffic encryption key generator 250, and the Key Reply/Reject message sender 260 so as to generate and distribute the respective service-specific traffic encryption keys corresponding to the request for allocation of the service-specific traffic encryption key by the SS 100, or to send an error code to the SS 100 upon an error occurred in generation of the traffic encryption key.

In the foregoing detailed description, only certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature, and not restrictive.

The effects of the present invention are as follows:

A function of allocating various service-specific traffic encryption keys provided in the system is supportable so that various services such as a multicast service or a broadcast service can be safely provided, and thereby attracting a larger number of subscribers and contributing to the activation of services.

In addition, the generation and management of traffic encryption keys by each service can guarantee stronger security of the services.

Further, the management of different traffic encryption key allocated by each multicast service group can guarantee security maintenance for the respective multicast service.

While this invention has been described in connection with what is presently considered to be the most practical and preferred embodiment, it is to be understood that the invention is not limited to the disclosed embodiments, but, on the contrary, is intended to cover various modifications an equivalent arrangements included within the spirit and scope of the appended claims.

The invention claimed is:

1. A method for requesting an encryption key by a subscriber station in a wireless communication system, the method comprising:

determining a service type of a traffic connection;

transmitting a first message including an identifier corresponding to the service type that requests an encryption key corresponding to the service type to a base station; and receiving a second message including the encryption key corresponding to the service type from the base station, wherein the encryption key is generated according to the determined service type before establishing a traffic connection with the base station, wherein, when the encryption key is not generated for the determined service type, the base station generates a Key Reject message including an error code indicating a failure reason and the generated Key Reject message is sent to the subscriber station using a MAC message, and wherein the base station sends an unsupported service type error code to the subscriber station when the encryption key is not generated for the determined service type.

2. The method as claimed in claim 1, wherein the first message is a key request message.

3. The method as claimed in claim 1, wherein the service type is one of a unicast service, a multicast service, and a broadcast service.

4. The method as claimed in claim 1, wherein when the service type is a multicast service, the first message includes an identifier of a multicast service group of a subscriber.

5. A method for distributing an encryption key by a base station in a wireless communication system, the method comprising:
   receiving a first message including an identifier corresponding to a service type of a traffic connection to request the encryption key from a subscriber station;
   generating the encryption key corresponding to the service type;
   generating a second message including the encryption key;
   transmitting the second message including the encryption key to the subscriber station; and
   transmitting a Key Reject message, which includes an unsupported service type error code, to the subscriber station using a MAC message, when the controller generates an error for the request of the encryption key from the subscriber station for the service type being unsupported.

6. The method as claimed in claim 5, wherein the first message is a key request message.

7. The method as claimed in claim 6, wherein the second message is a key reply message including the encryption key corresponding to the service type.

8. The method as claimed in claim 5, wherein the service type is one of a unicast service, a multicast service, and a broadcast service.

9. The method as claimed in claim 5, wherein when the service type is a multicast service, the first message includes an identifier of a multicast service group of a subscriber.

10. The method as claimed in claim 5, wherein the base station sends an unauthorized multicast service group ID type error code to the subscriber station when the service type for the encryption key requested by the subscriber station is a multicast service that is an unsupported multicast service for a specific multicast service group ID.

11. An apparatus for requesting an encryption key in a wireless communication system, the apparatus comprising:
   a transmitter for transmitting a first message requesting the encryption key to a base station;
   a receiver for receiving a second message from the base station; and
   a controller for determining a service type of a traffic connection, generating the first message including an identifier corresponding to the service type, transmitting the first message to the base station through the transmitter to request an encryption key corresponding to the service type, and receiving the second message including the encryption key corresponding to the service type from the base station through the receiver,
   wherein the encryption key is generated according to the determined service type before establishing a traffic connection with the base station,
   wherein, when the encryption key is not generated for the determined service type, the base station generates a Key Reject message including an error code indicating a failure reason and the generated Key Reject message is sent to the subscriber station using a MAC message, and
   wherein the base station sends an unsupported service type error code to the subscriber station when the encryption key is not generated for the determined service type.

12. The apparatus as claimed in claim 11, wherein the first message is a key request message.

13. The apparatus as claimed in claim 11, wherein the service type is one of a unicast service, a multicast service, and a broadcast service.

14. The apparatus as claimed in claim 11, wherein when the service type is a multicast service, the first message includes an identifier of a multicast service group of a subscriber.

15. The apparatus as claimed in claim 11, further comprising a memory for storing information including the encryption key or the error code resulting from an analysis by a message analyzer controlled by the controller.

16. An apparatus for distributing an encryption key in a wireless communication system, the apparatus comprising:
   a receiver for receiving a first message including an identifier corresponding to a service type of a traffic connection to request the encryption key from a subscriber station;
   a generator for generating the encryption key corresponding to the service type;
   a transmitter for transmitting a second message to the subscriber station;
   a controller for receiving the first message from the subscriber station through the receiver, generating the encryption key corresponding to the service type, and generating the second message including the encryption key; and
   a Key Reject transmitter for transmitting a Key Reject message, which includes an unsupported service type error code, to the subscriber station using a MAC message, when the controller generates an error for the request of the encryption key from the subscriber station for the service type being unsupported.

17. The apparatus as claimed in claim 16, wherein the first message is a key request message.

18. The apparatus as claimed in claim 17, wherein the second message is a key reply message including the encryption key corresponding to the service type.

19. The apparatus as claimed in claim 16, wherein the service type is one of a unicast service, a multicast service, and a broadcast service.

20. The apparatus as claimed in claim 16, wherein when the service type is a multicast service, the first message includes an identifier of a multicast service group of a subscriber.

* * * * *